(12) United States Patent
Quan

(10) Patent No.: US 8,374,489 B2
(45) Date of Patent: Feb. 12, 2013

(54) METHOD AND APPARATUS FOR INDUCING AND OR REDUCING GEOMETRIC DISTORTIONS IN A DISPLAY VIA POSITIVE GOING PULSES

(75) Inventor: Ronald Quan, Cupertino, CA (US)

(73) Assignee: Rovi Technologies Corporation, Santa Clara, CA (US)

( * ) Notice: Subject to any disclaimer, the term of this patent is extended or adjusted under 35 U.S.C. 154(b) by 576 days.

(21) Appl. No.: 12/565,531

(22) Filed: Sep. 23, 2009

(65) Prior Publication Data
US 2011/0069233 A1    Mar. 24, 2011

(51) Int. Cl.
H04N 5/91    (2006.01)
H04N 7/167    (2006.01)

(52) U.S. Cl. ................................. 386/255; 380/221
(58) Field of Classification Search .......... 380/201–204, 380/221; 386/252, 254, 257; 348/533–535
See application file for complete search history.

(56) References Cited

U.S. PATENT DOCUMENTS

| | | | |
|---|---|---|---|
| 4,163,253 A | | 7/1979 | Morio et al. |
| 4,353,091 A * | | 10/1982 | Hoppe ............................ 348/194 |
| 4,393,394 A * | | 7/1983 | McCoy ........................... 348/587 |
| 4,631,603 A | | 12/1986 | Ryan |
| 4,819,098 A | | 4/1989 | Ryan |
| 5,012,340 A * | | 4/1991 | Kirschenstein ................ 348/524 |
| 5,130,810 A | | 7/1992 | Ryan |
| 5,583,936 A * | | 12/1996 | Wonfor et al. ................. 380/204 |
| 6,583,814 B1 * | | 6/2003 | Runtze et al. .................. 348/189 |
| 6,592,228 B1 * | | 7/2003 | Kawashima et al. .......... 353/101 |
| 6,836,549 B1 * | | 12/2004 | Quan et al. ..................... 380/221 |
| 7,492,896 B2 * | | 2/2009 | Quan ............................. 380/221 |
| 7,620,178 B2 * | | 11/2009 | Wonfor et al. ................. 380/204 |
| 7,706,533 B2 * | | 4/2010 | Quan ............................. 380/221 |
| 2005/0111661 A1 * | | 5/2005 | Wijnen et al. ................. 380/200 |
| 2008/0100597 A1 | | 5/2008 | Quan |
| 2010/0054469 A1 | | 3/2010 | Quan |
| 2011/0135277 A1 * | | 6/2011 | Quan ............................. 386/256 |

FOREIGN PATENT DOCUMENTS

EP    0 923 240 A1    6/1999

OTHER PUBLICATIONS

International Search Report for International application No. PCT/US2010/048731, mailed May 10, 2011, 2 pages.

* cited by examiner

*Primary Examiner* — Paulos M Natnael
(74) *Attorney, Agent, or Firm* — George B. Almeida

(57) ABSTRACT

In certain flat screen TV sets, such as LCD monitors, geometric errors can be induced in a video signal by positive going pulses. That is, a shift in a display is provided when one or more positive going pulse is added to the video signal following one or more sync pulse. To illustrate, AGC pulses, generally used for content control and or copy protection in the last lines of an active video field, cause a shift (horizontal displacement) in the picture for these last lines in the active field. Alternatively, turning off or attenuating such positive going pulses in the last lines of the active field, eliminates or reduces the picture shift.

4 Claims, 4 Drawing Sheets

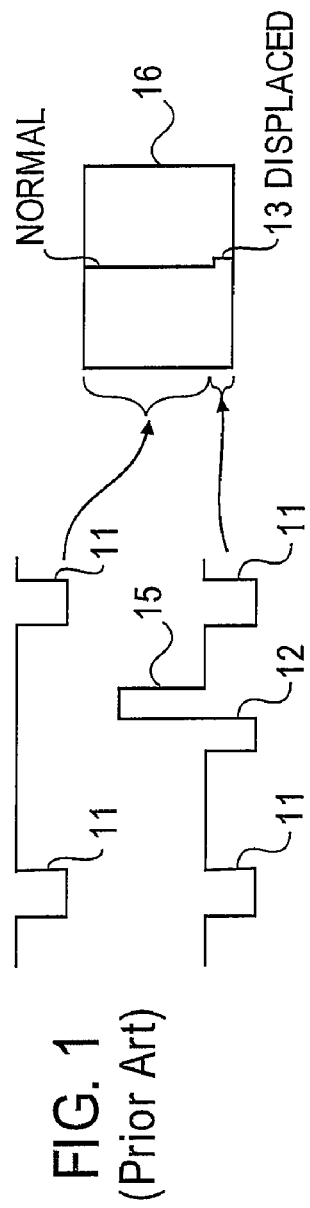
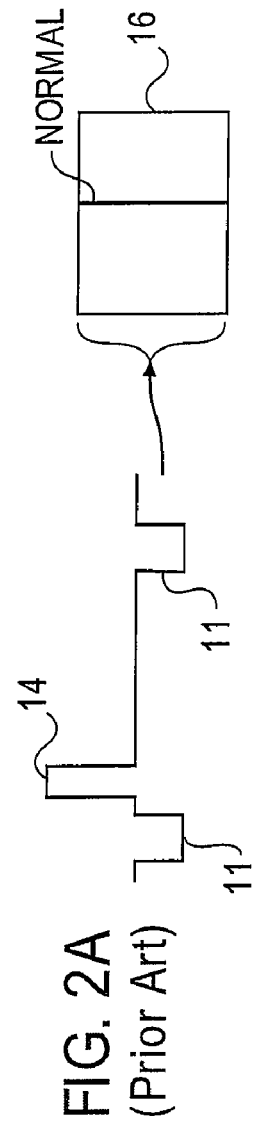
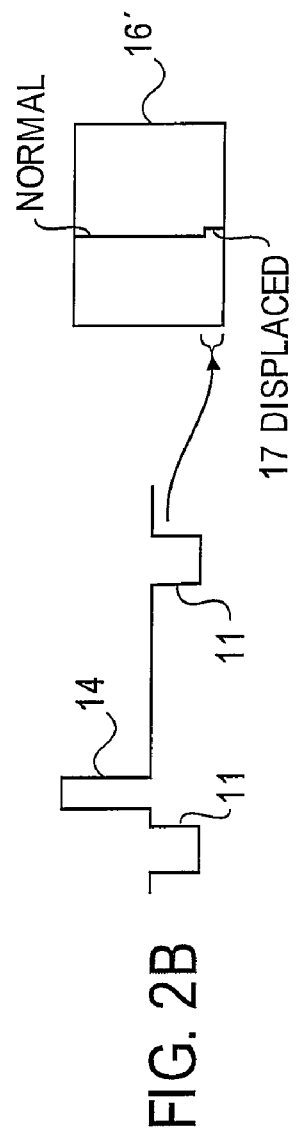
FIG. 1 (Prior Art)
FIG. 2A (Prior Art)
FIG. 2B

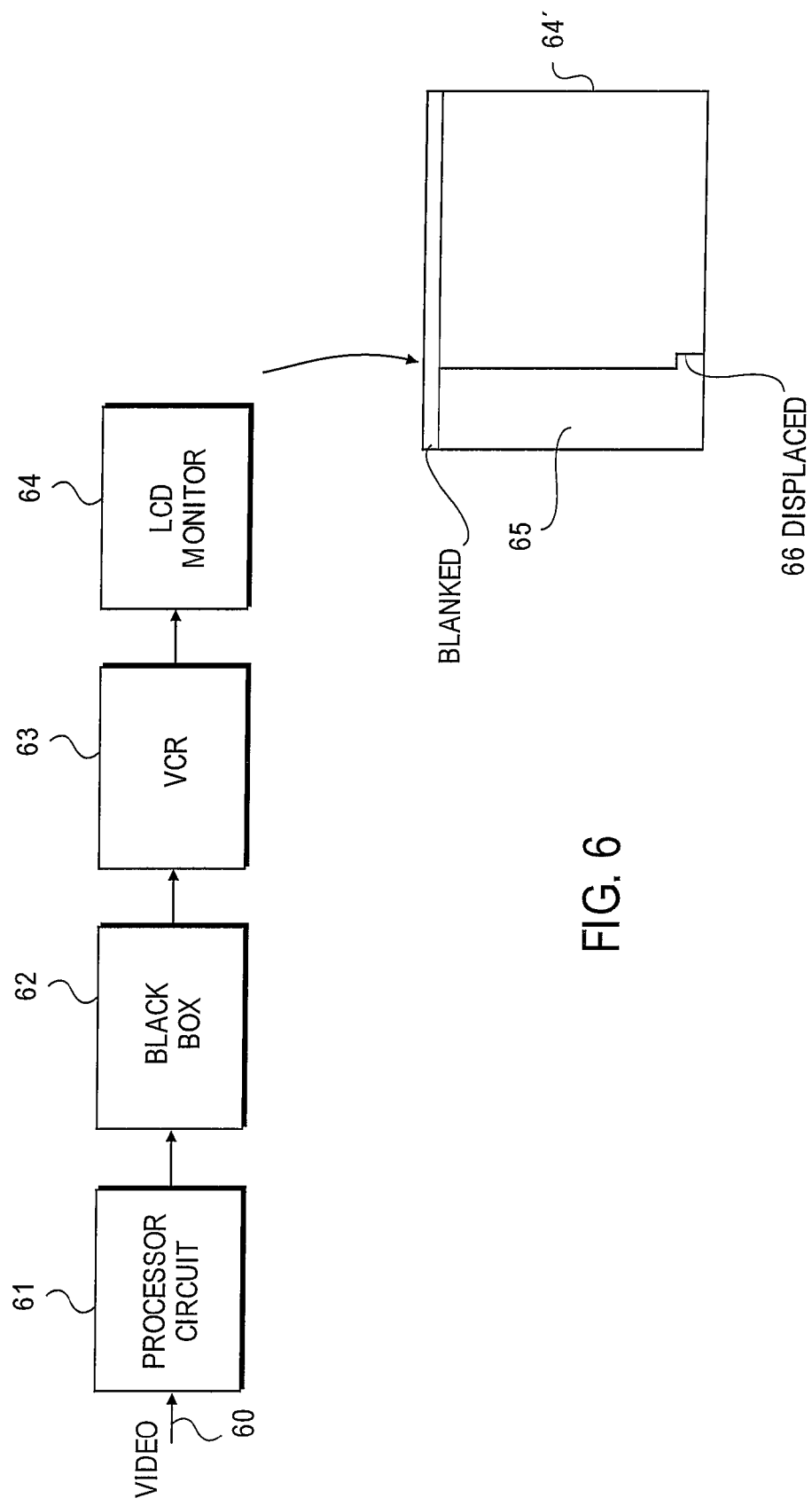

METHOD AND APPARATUS FOR INDUCING AND OR REDUCING GEOMETRIC DISTORTIONS IN A DISPLAY VIA POSITIVE GOING PULSES

BACKGROUND

The present invention relates to copy protection signals which are caused by positive going pulses, wherein the signals are playable but not recordable. Heretofore, playability in terms of geometric distortion has been related only to negative going pulses such as pseudo sync pulses. The negative going pulses cause the sync separator circuit and horizontal oscillator in TV sets such as those having a CRT (cathode ray tube) monitor, to generate a slight erroneous scan.

SUMMARY

To the contrary, in certain flat screen TV sets such as LCD monitors, it is found that geometric errors can be induced in a video signal display by positive going pulses. That is, a shift in the display is provided when one or more positive going pulse follows one or more sync pulse. For example, automatic gain control (AGC) pulses, generally used for content control and or copy protection in the last lines of an active field, cause a shift (e.g., a horizontal displacement) in the picture for these last lines of the active field.

An embodiment comprises a method of applying one or more positive going pulses in the horizontal blanking interval in one or more TV line to induce shifting in the one or more TV line on a display such as a flat screen TV, including (geometric) shifting as seen on the display in the location of the line(s) in which the one or more positive going pulses in the horizontal blanking interval is applied to, or inserted or added to.

Another embodiment applies one or more positive going pulse in the horizontal blanking interval in one or more TV line, and one or more added pseudo sync/AGC pulse pair signal(s) in TV lines other than the lines containing the positive going pulses in the horizontal blanking interval. This induces (geometric) shifting in one or more TV line (of the display), which includes the one or more positive going pulse.

In yet another embodiment, programming or providing a (geometric) shift in a portion of the active field is combined with a content control signal and or copy protection signal (which causes a "black box" to pass through at least one of the copy protection signals). This embodiment provides resistance to "black boxes" (copy protection circumvention devices) or provides added enhancement to a copy protection process via the black box. It follows that the black box becomes an "unwitting" processing circuit to cause blanking in a portion of a video signal, which then enhances a copy protection effect.

In another embodiment of the invention, adding positive going pulses in a portion of the active field and adding negative going pulses in a portion of the vertical blanking interval provides a geometric shift pattern in a portion of the active video field and in a portion of the vertical blanking interval.

Various embodiments for defeating or for controlling the amount of shifting also are described further herein. One embodiment includes removing or attenuating one or more AGC pulse in a portion of an active field to provide means for reducing the amount of geometric shifting of a displayed picture on a monitor.

Thus, in an alternative embodiment, attenuating or turning off the AGC pulses in the last lines of the active field and or the pseudo sync/AGC pulse pairs in the vertical blanking interval, reduces or eliminates the picture shift.

BRIEF DESCRIPTION OF THE DRAWINGS

FIG. 1 is a waveform illustrating the response of a TV monitor to a normal video signal and to a pseudo sync pulse, as exists in the prior art.

FIG. 2A is a waveform illustrating the response of a TV monitor to a positive going pulse, as exists in the prior art.

FIG. 2B is a waveform illustrating the response of a different TV monitor to a positive going pulse, in accordance with the invention.

FIG. 6 is a block diagram illustrating yet another embodiment of the invention in an associated environment.

DETAILED DESCRIPTION

Figure 3:
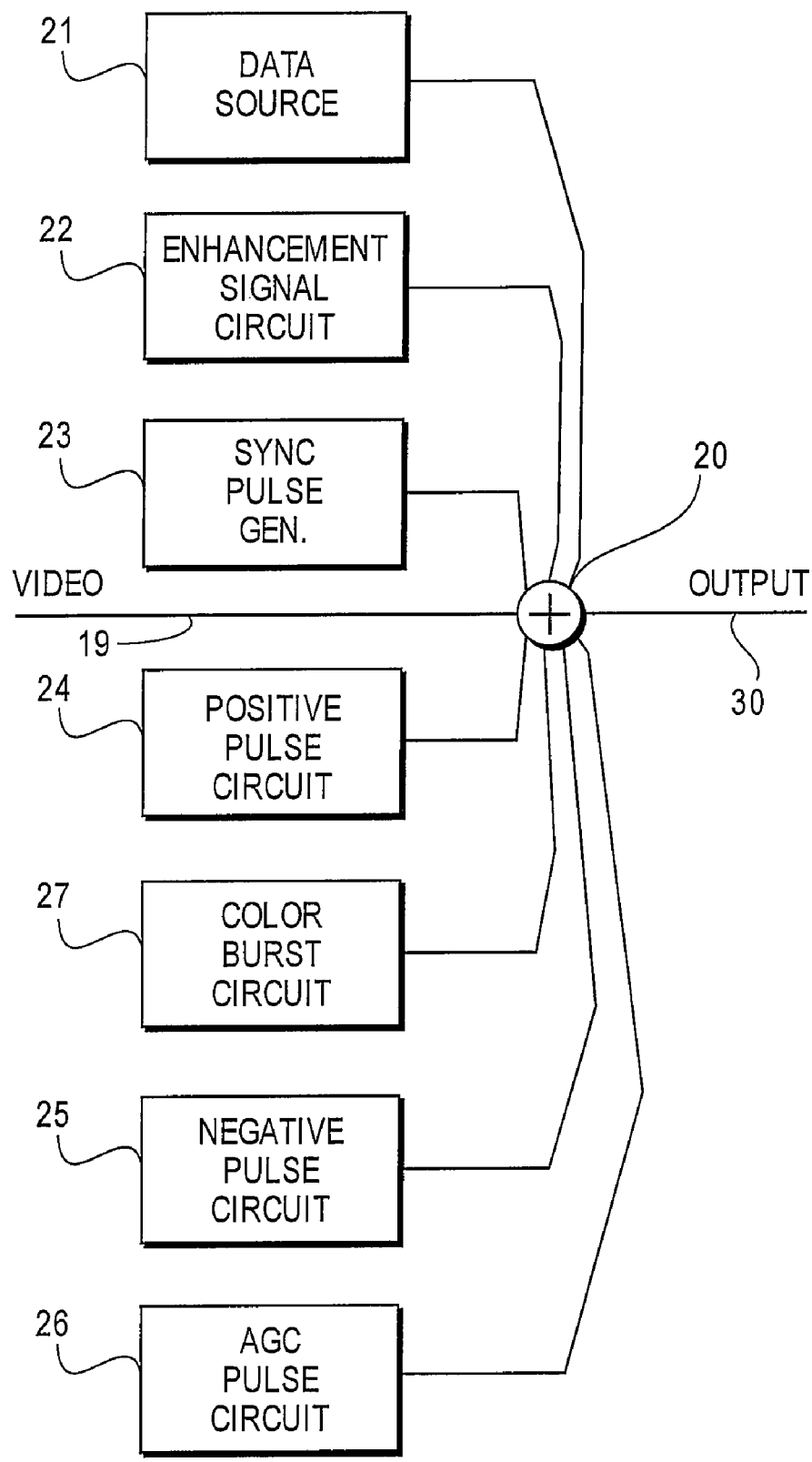
FIG. 3 is a block diagram illustrating an embodiment(s) of the invention.

A copy protection process disclosed in U.S. Pat. No. 4,631,603 by John O. Ryan, December 1986, assigned to Macrovision Corporation, Santa Clara, Calif., incorporated by reference, is well known to have placed pseudo sync and AGC pulses in specific television (TV) lines for pre-recorded video home systems (VHS) tape and digital video disc (DVD) playback devices. FIG. 1 shows a video signal with normal sync pulses 11 in the active field, which, when displayed, shows normal scanning by a TV monitor 16. Also shown in FIG. 1, in TV lines in the bottom of the active field, are additional pseudo sync pulse 12 and a positive going pulse (AGC) 15, which cause a displacement or positional shift 13 in the normal scan on monitor 16. In practice, when positive pulse 15 is attenuated or removed, negative going pulse 12 causes the displacement or geometric/positional shift as seen at 13.

Copy protection processes disclosed in U.S. Pat. Nos. 4,819,098 and 5,130,810, by John O. Ryan, April 1989 and July 1992 respectively, assigned to Macrovision Corporation, Santa Clara, Calif., incorporated by reference, are well known to have placed AGC pulses following a horizontal sync pulse in specific television (TV) lines for pre-recorded video home systems (VHS) tape and digital video disc (DVD) playback devices. Another patent, U.S. Pat. No. 4,163,253 by Morio July 1978, incorporated by reference, also shows placing AGC pulses after horizontal sync pulses. FIG. 2A shows a video signal with a positive going pulse 14 following the sync pulse 11 (in a horizontal blanking interval) and added to the last lines of the active field. A typical TV monitor such as a CRT display 16, provides a normal scan, without deviation or shifting at the bottom of a displayed picture.

FIG. 2B shows a video signal with a positive going pulse 14 added to the last video lines of the active field wherein the video signal is coupled to a different type of TV monitor, 16' (such as an liquid crystal display (LCD), TFT display, or flat screen display). Here, in the lines that have the positive going pulses (e.g., a positive going pulse in a horizontal blanking interval), the displayed program material or video signal is geometrically shifted or displaced unexpectedly on the last lines of the active field on the monitor 16', as illustrated at 17. In some flat screen displays with a horizontal and vertical delay (HV delay), that show the horizontal blanking interval and vertical blanking interval within the frame of the display, the one or more positive going pulses by themselves or in combination with pseudo sync pulses in succeeding lines causes a displacement in one or more line in the location of the positive going pulses, prior to the pseudo sync pulses.

FIG. 3 shows an example of apparatus for providing the positive going pulses that generate the positional shift or displacement on a TV monitor, such as depicted in FIG. 2B, wherein the TV monitor may be in a normal scan, an underscan, or a delayed horizontal and or delayed vertical scan mode.

Video in the form of an analog or digital video signal is coupled via an input 19 to a combining circuit 20. In turn, combining circuit 20 is selectively coupled to, a data source 21, an enhancement signal circuit 22, a sync pulse generator 23, a positive going pulse circuit 24, a negative going pulse circuit 25, an AGC pulse circuit 26 and a color burst signal circuit 27. Therefore, the combining circuit 20 may receive a signal or signals from one or more of the circuits 21-27 and functions to combine the one or more signals with the video signal on input 19 to provide a resulting output signal on output 30. More particularly, the combining circuit 20 may include or be coupled to, a data signal from data source 21, a copy protection enhancement signal from the enhancement signal circuit 22, horizontal and or vertical sync pulses from the sync pulse generator 23, positive going pulses from the positive pulse circuit 24, negative going pulses from negative pulse circuit 25, AGC pulses from the AGC pulse circuit 26 and or a color burst signal from the color burst circuit 27.

Generally, the AGC pulses from circuit 26 form for example a pulse pair signal with negative going pulses from circuit 25, to provide for example a pseudo sync/AGC pulse pair signal. It is noted that modulation of the AGC pulse in the pseudo sync/AGC pulse pair signal may be provided or generated. Modulation may include amplitude, frequency, position, pulse width, and or phase modulation of one or more positive going pulses.

Positive going pulses from the circuit 24 generally are "paired" with horizontal and or equalizing pulses from, for example, the sync pulse generator 23.

When the positive going pulses are activated, certain types of TV monitors (e.g., LCD, TFT or flat screen monitors) will exhibit a positional shift, or displacement, as described for example in FIG. 2B. Should a pseudo sync pulse be inserted or added, a further positional shift in a display is provided, usually in a different area from the location of the positive going pulses. Should AGC pulses be added, then an output signal from output 30 will comprise a copy protection signal, which causes additional shifting of the picture on a monitor.

An embodiment where modulation of the pseudo sync/AGC pulse pair signal is applied (e.g., amplitude modulation of the AGC pulses), along with the positive going pulses, provides a dynamic copy protection effect on a recorder, which provides an additional shift in the display during at least one line of the location of the positive going pulses.

The enhancement signal circuit 22 generally adds a level shifting voltage to an active picture area, and or to a portion of the front and or back porch of selected line(s) of the video signal. In an alternative embodiment, one or more negative going pulse, which is detectable by a sync separator, may be provided in sufficient TV line(s) after a post equalizing pulse of a vertical sync signal, to cause resistance to a black box, or to cause a black box to unexpectingly enhance the copy protection effect. For example, such resistance or enhancement may include, the black box in response to newly specified location of negative going or pseudo sync pulses (immediately or 1 or less than 2 or 2.5 lines) following a vertical sync signal or post equalizing pulse. The black box or circumvention device then causes blanking one or more color burst and or one or more portion of one or more active field TV line, or causes the circumvention device to sufficiently blank out portions of the video signal to impair reading of data/reference/test signals, such as closed caption signal(s).

Not shown in FIG. 3 is a color burst modification, which includes phase modulation of at least a portion of the color burst signal over one or more lines. This phase modulation may be added as a process for copy protection and or content control.

Figure 4:
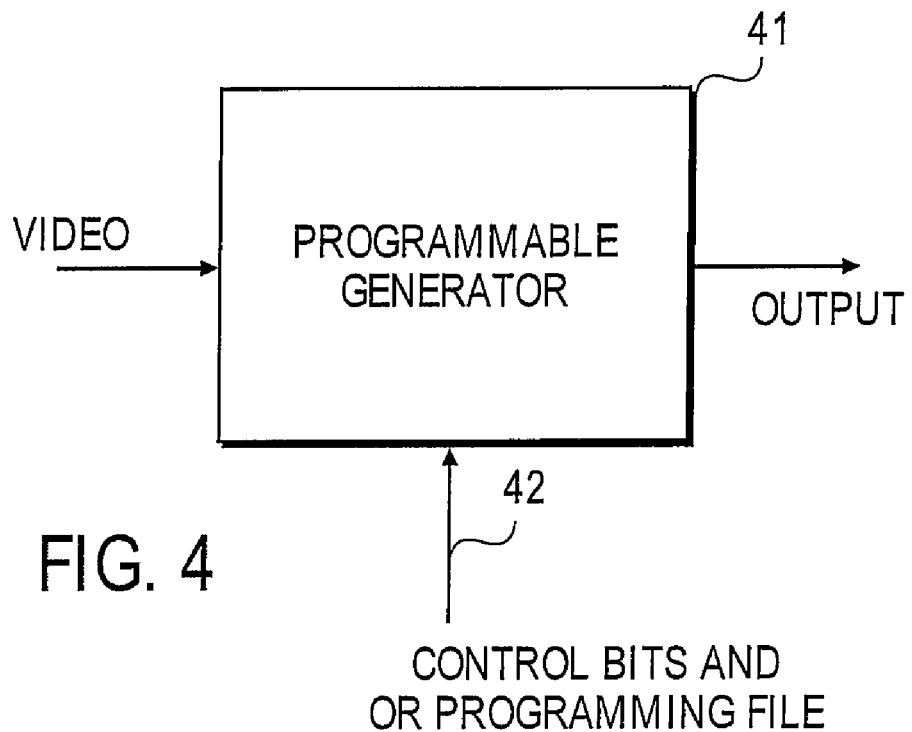
FIG. 4 is a block diagram illustrating another embodiment of the invention.

FIG. 4 shows a programmable generator 41, which inserts or adds any of the waveforms, or signals from the circuits 21-27, as seen in FIG. 2B or 3, respectively. Here one or more bit pattern(s) on an input 42 activate or deactivate the added positive going, negative going, and or enhancement signal(s). The bit pattern may be stored, read, entered, generated, or received.

Figure 5:
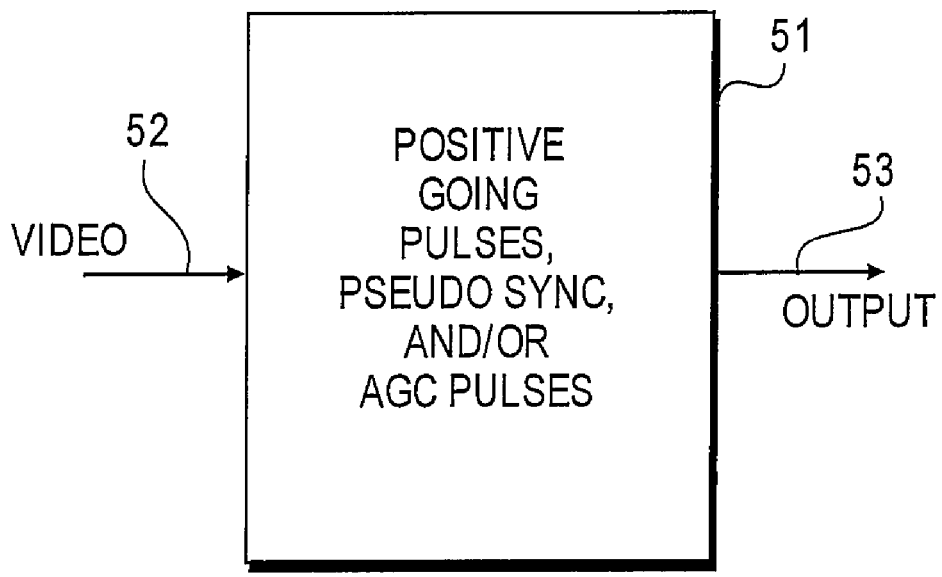
FIG. 5 is a block diagram illustrating a further embodiment of the invention.

FIG. 5 shows a simplified block diagram 51 with video input 52 and output 53, wherein positive going pulses provide the (geometrical) positional shift, and pseudo sync AGC pulses provide a content control and or copy protection signal.

A copy protection process disclosed in U.S. patent application Ser. No. 12/322,004 by Ronald Quan, assigned to Macrovision Corporation, Santa Clara, Calif., shows methods of generating pseudo sync pulses (and or pulse signals) to provide resistance to circumvention devices (or cause certain circumvention devices to enhance a copy protection signal) is incorporated by reference. Also U.S. Pat. No. 6,836,549 (incorporated by reference) by Ronald Quan, shows methods of position, pulse-width, and or amplitude modification or modulation of sync, pseudo sync, and or AGC pulses. FIG. 6 shows an alternate process for pseudo sync and or pulse pair signals. Either or both of these signals are located, for example, in the VBI and or its vicinity of line(s) in a manner to provide a signal such that a circumvention device causes blanking and or other artifacts in combination with a shifting effect toward the bottom of the screen, via positive going pulses in the HBI in selected lines. A description of certain black boxes (or circumvention devices) is included below. Also, a description of how playability can be improved in the VBI region and or in the one or more lines following the VBI is also included below. Improved playability in the VBI region and or line(s) after the VBI is combined with the shifting effect caused by the positive going pulses in selected HBI of TV lines via location and formatting of pseudo sync signals. For example, moving/shifting pseudo sync signals closer to the vertical sync signal (or closer to a post pseudo sync signal/pulse), or interweaving the pseudo sync AGC signals in an alternating manner of Format A followed by Format B, to synthesize two or more consecutive TV lines with Format A or Format B.

For example, Format A may include N number of pseudo sync pulses per lines, and Format B may include M number of pseudo sync pulses per line. Generally, M is not equal to N. Also, Format A may have different pulse width (and or position) of pseudo sync pulses, than does Format B. For improved playablility, a series of TV lines with pseudo sync pulses can have an alternating pattern of Format A and Format B, and two (or more) TV lines with Format A=Format B (or where M=N) in a consecutive manner.

In some circumvention devices it was found experimentally that the black box devices can be disabled by observing the behavior of the microprocessors or certain traditional timing circuits in the black boxes, while still providing an effective anti-copy protection signal at the output of the device. To reiterate, an anti-copy protection signal or video copy protected signal is playable on a TV display, while prohibiting recording. That is, recording is prohibited by causing an erroneous signal level by affecting an AGC system in a recorder, to cause darkening, changes in contrast and or brightness levels. And unlike a scrambled video signal, which is not playable on a TV display, a copy protected video signal is displayed normally (e.g., with few, negligible or zero artifacts). In general, a video copy protection signal, or anti-copy protection signal, is provided, added, and or inserted in a video signal to produce/provide a copy protected video signal.

Accordingly, it would be desirable to provide, generate, or synthesize a video copy protection signal which in effect thwarts one or more intended functions of a circumvention device. One effect is to cause a circumvention device to allow the passage therethrough of a number of copy protection pulses or signals such that a VCR (or record control device/recorder or compliant device) still reacts to the copy protection signals following the circumvention device. Another effect is to design a copy protection signal such that when it is supplied to a circumvention device, the output of the circumvention device still supplies a detectable copy protection signal to a compliant video recorder or compliant device.

Yet another effect of an embodiment of the invention is to synthesize a copy protection signal such that when coupled to a circumvention device, the output of the circumvention device causes playability problems in a display. Alternatively, the output causes increased copy protection effect(s) such as blanking out a portion of the viewable area and or causing chroma artifacts, while in combination with one or more positive going pulse(s) in the HBI of selected TV lines causes (geometric) shifting in certain TV displays.

The above mentioned effects can be implemented in a number of ways such as by moving, adding, or shifting anti-copy protection signals toward the vertical sync signal (e.g., in 525 and or 625 line TV standards). Alternatively, the effects can be implemented by synthesizing an anti-copy protection signal such that there is no more than one video line free of negative going pulse(s) between one horizontal blanking interval and a next horizontal blanking interval (e.g., one or more pseudo sync pulse is provided between lines).

Yet another feature of the invention improves playability in terms of reducing hooking that can be viewable in some monitors on the top portion of their displays. In particular, an embodiment provides a copy protection process comprised of Format A and Format B, wherein the formats are interleaved from one TV line to another. Because the formats have in general different positions of pseudo sync pulses or different numbers of pseudo sync pulses for each format, a TV scanning system's phase lock loop system can be excited into causing errors in scanning. By shifting the pseudo sync pulses of the Format A and Format B copy protection signals closer to the vertical sync signal area or away from the active field, the phase lock loop system is allowed to settle in such a way that playability is improved or a scanning error is reduced. Alternatively, the playability is improved when Format A equals Format B (or vice versa) in two or more consecutive TV lines, for copy protection signals such as pseudo sync or pseudo sync/AGC pulse pair signal(s), or when the copy protection signals are shifted away from the active field, or when the copy protection signals are moved closer to the vertical sync signal in the vertical blanking interval (VBI).

Another embodiment of the invention includes fewer TV lines with pseudo sync pulses in the VBI (e.g., for improved playability). For example, a copy protection signal is generated such that there is one or more fewer lines with pseudo sync so that there is an increased gap between the last TV line having pseudo sync pulse(s) and the beginning of the TV field. In prior art copy protection processes such as those using pseudo sync pulses for a PAL standard, the pulses end at line YY. In a NTSC standard the pseudo sync pulses end at line ZZ. To improve playability for example, for PAL the last TV line having pseudo sync pulse(s) would be line (YY-k), where k is typically 1 or 2 or >=1. Alternatively, in a NTSC/525 line standard the last TV line having pseudo sync pulse(s) would be line (ZZ-j), where j is typically 1 or 2 or >=1. A typical line number for a PAL/625 line standard on line YY (last TV line with pseudo sync) is 16 and 328 for Format A and or 15 and 327 for Format B, while a typical line number for NTSC/525 lines on line ZZ (last TV line with pseudo sync) is 17 or 280.

Thus, an example to improve playability would have the last pseudo sync pulse line location prior to 16,328,15, and or 327 for a 625 line TV standard, and similarly would have the last pseudo sync pulse line location prior to 17 and or 280 for a 525 line TV standard. Accordingly, generating pseudo sync pulses that end at line 16 and or 279 or earlier for a 525 line standard would improve playability over a prior art process. Similarly for a 625 line TV standard, generating pseudo sync pulses that end for Format A at line 15 or 327 or earlier, and or for Format B at line 14 or 326 or earlier would improve playability over a prior art process.

Thus, one embodiment of the invention provides an improved playability copy protection signal, wherein the copy protection signal includes pseudo sync signals and provides in TV lines the pseudo sync signals located away from the active video field or closer to the vertical sync signal, wherein the (newly located or provided) pseudo sync signals provide less scanning errors or geometric distortion on a TV set. As described above, the pseudo sync signals may have the same or a different number of pseudo sync pulses from one TV line to another or the same or a different pseudo sync pulse width from one TV line to another line.

Another embodiment of the invention includes providing an improved playability of a copy protection signal, wherein the copy protection signal includes pseudo sync pulses (or pulse pair signals of pseudo sync and AGC signals) of a different number of pseudo sync or pseudo sync and AGC signals, from one TV line to another line, and or different pseudo sync or pseudo sync and AGC pulse widths from one TV line to another. This embodiment includes modifying or providing at least one TV line to provide at least two lines consecutively with substantially the same number of pseudo sync pulses and or substantially the same pseudo sync pulse width. It should be noted that the resulting copy protection signal may still include an alternating pattern or format of a number of pseudo sync pulses and or pseudo sync pulse widths from one line to another.

By way of example, an embodiment of the invention may have, in a 625 line standard such as, for example, PAL or Secam, a Format A, which has 7 (or 6 or at least 1) pseudo sync or AGC pulses on video line 7 (or line number 8, 318 or 319), followed by Format B, which has 6 (or 7 or at least 1) pseudo sync or AGC pulses on video line 8 (or line number 7 or 318 or 319). For example, two to ten TV lines after (and or including) line(s) 7, 8, 318, and or 319 may then include one or more pseudo syncs per line. This example embodiment provides resistance to the intended function of a circumvention device by, for example, causing the device to blank color burst in a portion of the active field, causing the circumvention device (black box) to remove or modify program video in an active portion of the TV field, and or causing the circumvention device to allow the passage of at least some or all of copy protection signals in a TV field. This embodiment also may provide improved playability of the program video signal.

It was found experimentally that certain circumvention devices time off the post equalizing pulses or pulses spaced apart by one half the horizontal line period (approximately 31 usecs to 32 usecs for 2H frequency pulses), and require one or two lines free of these half line period pulses to start the blanking process for removing copy protection pulses. By inserting pseudo sync pulses in a number of lines right after (or 1 line or less than 2 or 2.5 lines after) the post equalizing pulse or vertical sync signal, the circumvention device behaves as if the pseudo sync pulses are still part of the vertical sync signal. Thus, after a last pseudo sync pulse, which is located near the beginning of the TV field, blanking is provided by the circumvention device to inadvertently modify, blank or attenuate (typically 6 to 10 lines after the last TV line that has pseudo sync pulse(s)), data and or active picture TV lines (near the top of the screen of the display), while passing through to the output of the circumvention device sufficient copy protection pulses (e.g., pseudo sync and or AGC pulses) for providing a copy protected video signal.

Similarly, in a 525 line standard (e.g., NTSC or PAL-M), another embodiment of the invention provides one or more (e.g., 4) pseudo sync pulses or pseudo sync and AGC pulses (e.g., starting) at line(s) 10, 11, 272, and or 273. For example, two to ten TV lines after (and or including) line(s) 10, 11, 272, and or 273 may include one or more pseudo sync pulses per line. In this embodiment of a 525 line standard, resistance to a circumvention device is provided. For example, the circumvention device passes some or all of the copy protection signals to provide a copy protection or content control effect, whereas the circumvention devices intended function is to remove the copy protection signal to defeat a copy protection or content control effect.

The 525 or 625 line standard embodiments of previous example provide improved playability for the copy protection process (or for a content control signal), for example, in terms of reduced geometric distortion on a display, for example, in the VBI and or after the VBI.

FIG. 6 illustrates a typical environment wherein a video source (analog or digital) is coupled via an input 60 to a processor circuit 61 (e.g., one or more signals generated from FIG. 3 or 4). The output of the processor circuit 61 is coupled to a black box or circumvention device 62. Device 62 may pass substantially some or all of the positive going pulses. The output of the black box device 62 is coupled to an input of a recorder 63 (e.g., VCR), and the output of the recorder 63 is coupled to a flat screen monitor 64. A detailed illustration of the scanning effects is shown via a display 65 on the monitor 64. Here, in spite of the fact that the video signal is connected to a black box, the monitor 64' shows a displacement 66 in the scanning of one or more TV lines where the positive going pulses are present. Also shown on monitor 64', the top portion of the viewable displayed program video is blanked via black box 62 in response to a copy protection signal wherein there is one or more pseudo sync pulses following immediately after (or less than two lines or one line after) the vertical sync signal in the VBI. Because the black box 62 blanks out a portion of the video signal including burst and at least one line of the active picture area, pseudo syncs are also present at the output of circumvention device 62, which then may provide added scanning errors to a TV monitor.

An embodiment of the invention may include circuitry to receive a copy protected signal including positive going pulses in one or more horizontal blanking intervals that cause a positional shift on a monitor. This circuitry includes switching, attenuating, narrowing, position shifting, and or level shifting circuits to remove, attenuate, position shift (e.g., position modulation), and or narrow one or more of the positive going pulses. The positive going pulses induce the displayed positional shift on the monitor to lessen or eliminate the (displayed) positional shift on the monitor, wherein for example the displayed positional shift on the monitor are TV lines associated with one or more lines (originally) containing the positive going pulses in one or more horizontal blanking interval.

For example, an embodiment of the invention includes a method or apparatus for controlling or defeating the amount of geometric distortion caused by the addition of positive going pulses in a portion of an active field of a video signal, comprising:

attenuating or removing one or more of the positive going pulses in the portion of the active field.

That which is claimed is:

1. Method of inducing geometric distortion in a display of a video signal on a video monitor, wherein the video signal includes video lines with horizontal and vertical sync pulses, comprising:
    adding or inserting one or more positive going pulse following respective one or more sync pulse in selected video lines of the display, to cause a horizontal displacement in the selected video lines of the display, which displacement defines the geometric distortion;
    applying the one or more positive going pulses in a horizontal blanking interval; and
    adding or inserting one or more pseudo sync and automatic gain control (AGC) pulse pair signals in video lines other than the lines containing the positive going pulses in the horizontal blanking interval.

2. Method of inducing geometric distortion in a display of a video signal on a video monitor, wherein the video signal includes video lines with horizontal and vertical sync pulses, comprising:
    adding or inserting one or more positive going pulse following respective one or more sync pulse in selected video lines of the display, to cause a horizontal displacement in the selected video lines of the display, which displacement defines the geometric distortion;
    adding or inserting the one or more positive going pulse in a portion of the active field; and
    combining the one or more positive going pulse with a content control signal and or a copy protection signal, to circumvent the function of a circumvention device or provide added enhancement to a copy protection process, via the circumvention device.

3. Method of inducing geometric distortion in a display of a video signal on a video monitor, wherein the video signal includes video lines with horizontal and vertical sync pulses, comprising:
    adding or inserting one or more positive going pulse following respective one or more sync pulse in selected video lines of the display, to cause a horizontal displacement in the selected video lines of the display, which displacement defines the geometric distortion;
    adding or inserting the one or more positive going pulse in a portion of the active field; and
    adding or inserting negative going pulse(s) in a portion of a vertical blanking interval, to provide a geometric distortion in the portion of the active field and in a portion of the vertical blanking interval.

4. The method of claim 3 wherein the negative going pulses are pseudo sync pulses and the positive going pulses are automatic gain control (AGC) pulses, which together form pseudo sync/AGC pulse pairs.

* * * * *